United States Patent Office 3,532,685
Patented Oct. 6, 1970

3,532,685
N,N' - ALKYLENE-N,N'-BIS[(ALKOXY BENZOYL-OXY)ALKYL]ALKYLENE DIIMINES
Herbert Arnold, Bielefeld, Kurt Pahls, Brackwede, Rolf Rebling, Bielefeld, Norbert Brock, Uerentrup, near Bielefeld, and Hans-Dieter Lenke, Bielefeld, Germany, assignors to Asta-Werke AG, Chemische Fabrik, Brackwede, Germany, a corporation of Germany
No Drawing. Filed Dec. 7, 1966, Ser. No. 599,724
Claims priority, application Germany, Dec. 16, 1965, A 51,095
Int. Cl. C07d 53/00, 53/02
U.S. Cl. 260—239    3 Claims

ABSTRACT OF THE DISCLOSURE

There are provided new N,N'-alkylene-N,N'-bis-[(alkoxy benzoyloxy) alkyl] alkylene diimines and the addition salts thereof with pharmacologically acceptable acids. These materials are useful as coronary dilatants.

It is an object of the present invention to provide new basic esters having improved coronary dilatatory effectiveness.

The new products according to the present invention have the following general Formula I:

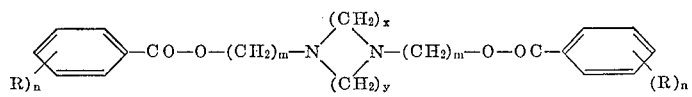

wherein R (which may have the same or a different meaning but preferably have the same meaning) represents a lower alkyloxy group, preferably the methoxy group, $n$ is a total numeral of from 1 to 3, preferably 3, $m$ is 2 or 3, $x$ is a total numeral of from 2 to 4, $y$ is 2 or 3 and $x$ and $y$ together represent a total numeral of from 5 to 7. The $m$'s may be the same or different.

Preferably, the preferably three groups R have the positions 3, 4 and 5 with respect to the carboxy group in the phenyl nucleus. Particularly favourable results are obtained with the homopiperazine derivatives, i.e. with the compounds of Formula I wherein $x$ is 2 and $y$ is 3. Most favourable results are obtained with the bis-ester of 3,4,5-trimethoxy benzoic acid and N,N'-(bis-ω-hydroxypropyl) homopiperazine. In the same way useful as the above mentioned basic esters are the corresponding salts thereof with pharmacologically acceptable acids, particularly with hydrochloric acid.

The process according to the present invention for producing the compounds of Formula I and of their salts with pharmacologically acceptable acids is characterized by that either:

(a) A N,N'-bis-ω-hydroxyalkyl compound of the general Formula II:

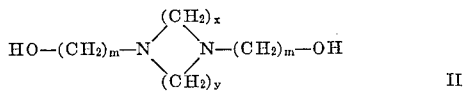

wherein $m$, $x$ and $y$ have the same meaning as in the above Formula 1, is subjected to reaction with a benzoic acid halogenide of the general Formula III

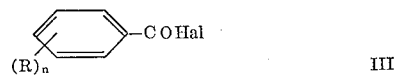

wherein R and $n$ have the same meaning as in the above Formula I and Hal represents a halogen, preferably chlorine or bromine, in manners known per se and, possibly, in the presence of an acid binding agent, or (b) An alkali or silver salt of a benzoic acid having the general Formula IV:

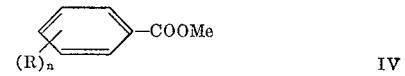

wherein R and $n$ have the same meaning as in the above Formula I and Me is an alkali metal or a silver metal cation, is subjected to reaction with a N,N'-bis-halogenoalkyl compound of the general Formula V:

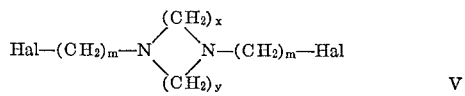

wherein $m$, $x$ and $y$ have the same meaning as in the above Formula I and Hal represents a halogen, preferably chlorine and bromine, in manners known per se at an elevated temperature, or (c) A benzoic acid ester of the general Formula VI:

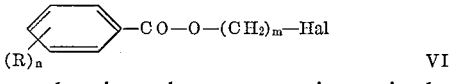

wherein R, $n$ and $m$ have the same meaning as in the above Formula I and Hal represents a halogen, preferably chlorine or bromine, is subjected to reaction with a compound of the general Formula VII:

wherein $x$ and $y$ have the same meaning as in the above Formula I, in manners known per se at an elevated temperature and, possibly, in the presence of an acid binding agent.

Preferably, the reaction components are used in equivalent amounts and/or the reaction is carried out at an elevated temperature and/or in the presence of an inert solvent. If a hydrohalogenic acid, for instance hydrochloric acid, is produced during the reaction, it is preferably carried out in the presence of an acid binding agent.

If desired, the thus obtained bases may thereafter be converted into acid addition salts with pharmacologically acceptable acids or the thus obtained salts may be converted into the free bases.

A most preferred manner of producing the compounds of Formula I is the reaction of an acid chloride of the substituted benzoic acid of Formula III with the diols of Formula II in an anhydrous inert organic solvent in the presence of a tertiary amine as acid binding agent or in the absence of an inert solvent in a tertiary amine which then serves both as acid binding agent and solvent. Acetone, dioxane, benzene or toluene may be preferably used as an inert solvent. However, the reaction may be carried out in the absence of a tertiary amine, too, thus producing the dihydrochlorides of the compounds of Formula I. In this case, it is most preferred to carry out the reaction in a solvent such as chloroform, benzene or dioxane.

The diols of Formula II used as starting materials may be produced in several manners. For instance, they may be produced by subjecting homopiperazine or the cor-

3 respondingly higher homologues to reaction with the corresponding ω-halogeno alcohols. Another way of producing these compounds is reacting a diaminodiol of the general Formula VIII:

HO—(CH$_2$)$_m$—NH—(CH$_2$)$_y$—NH—(CH$_2$)$_n$—OH  VIII with an alkylene dihalogenide of the general Formula IX:

Hal—(CH$_2$)$_x$—Hal  IX

This reaction is described for instance by K. Schlögl and R. Schlögl, Monatshefte der Chemie, vol. 95 (1964) p. 935. In the above formulae, $m$, $x$ and $y$ have the same meaning as in Formula I. The diamino dihalogenides of Formula V may be prepared for instance by the known method of reacting a compound of the Formula X:

Hal—(CH$_2$)$_m$—NH—(CH$_2$)$_y$—NH—(CH$_2$)$_m$—Hal  X with an alkylene dihalogenide of the Formula IX or by reacting a compound of the above Formula II with for instance thionyl chloride or thionyl bromide. The preparation of the compounds of Formula VII is described for instance in Ber. d. deutsch. chem. Ges., vol. 23 (1890) p. 326 and vol. 32 (1899) p. 2038.

The products of the present invention produce a particularly desirable coronary dilatation in humans over a prolonged period of time, for instance when administering in a daily dose of about 20 to 300 mg. The most effective product according to the invention has a higher effectiveness over a more prolonged period of time in comparison to known compounds producing coronary dilatation.

The following examples serve to further illustrate the invention without however limiting the same thereto.

EXAMPLE I 528.8 g. of bis-(3-hydroxypropyl)-ethylene diamine (K. Schlögl and R. Schlögl, Monatshefte der Chemie 95 (1964) p. 935) are dissolved in a mixture of 1500 cc. of anhydrous ethyl alcohol and 1250 g. of triethylamine. 520 g. of 1,3-chlorobromopropane are added thereto dropwise over a period of about 3 hours while stirring and heating the reaction mixture in an oil bath of 50° C. After completion of the addition, the oil bath is heated to 60° C. for 20 min. while stirring of the reaction mixture is continued. With increasing reaction time, triethylamine hydrochloride is precipitated. After completion of the reaction, the mixture is allowed to cool to room temperature. Triethylamine hydrochloride is separated by filtration and the filter cake is washed with 100 cc. of anhydrous ethyl alcohol. The alcohol and the excess of triethylamine is distilled off in a vacuum of a water pump. The residue represents a light-yellowish brown viscous oil which is extracted 3 times with 500 cc. of anhydrous benzene each time with stirring at 40 to 60° C. The benzene is distilled off on a water bath at 60° C. Thus, an oil is obtained which solidifies to a hard mass after some hours. This mass is crushed and dried over P$_2$O$_5$ in an exsiccator. The compound represents N,N'-bis-(3 - hydroxypropyl) homopiperazine. Yield: 128.5 g. F.P.: 46–47°C.; B.P. $_{0.02mm.}$: 141–142° C.

EXAMPLE II 21.6 g. of N,N'-bis-(3-hydroxypropyl) homopiperazine obtained according to Example I and 63.8 g. of 3,4,5-trimethoxy benzoic acid chloride are dissolved in 600 parts by volume of anhydrous chloroform. The solution is heated to boiling for 5 hours. Thereafter, chloroform is distilled off in a vacuum. The residue is dissolved in water and the aqueous solution is washed with ether. Thereafter, the aqueous phase is rendered alkaline by the addition of soda lye and the separated oily base is extracted with ether. The ethereal solution is dried over Na$_2$SO$_4$. Ether is separated in a vacuum and the highly viscous residue is dissolved in 150 parts by volume of ethyl alcohol. The calculated equivalent amount of ethereal HCl is added thereto. The soon crystallizing dihydrochloride is separated by filtration, dried and recrystallized from 120 parts by volume of ethanol. Thus, after drying for 3 days over P$_2$O$_5$, 40–50 g. (66–70% of the theoretical) of N,N'-bis-[3-3',4',5-trimethoxy benzoloxy) propyl] homopiperazine dihydrochloride containing 1 mol of water of crystallization is obtained. This product has a melting point at 194–198°C.

EXAMPLE III 25.5 g. of p-butoxy benzoic acid chloride dissolved in 50 cc. of anhydrous benzene are added with stirring to a warm solution of 10.1 g. of N-(2-hydroxyethyl)-N'-(3-hydroxypropyl) homopiperazine [B.P. $_{0.04\ mm.}$: 115–120° C.; prepared according to Example I from N-(2-hydroxyethyl)-N'-(3-hydroxypropyl)-ethylene diamine and 1,3-chlorobromopropane] and of 12.1 g. of triethylamine in 150 cc. of anhydrous benzene. After completion of the addition, the reaction mixture is heated to boiling at reflux for 1½ hour. After cooling, triethylamine hydrochloride is separated by filtration and the filter cake is washed with a small amount of benzene. The filtrate is treated with 2 N hydrochloric acid. Thus, the N-[2-(p-butoxy benzoyloxy) ethyl]-N'-[3-(p-butoxy benzoyloxy) propyl] homopiperazine reaction product is precipitated as dihydrochloride. The resulting dihydrochloride is filtered off and may be recrystallized from ethanol. It has a melting point at 178° C. For obtaining the free base, the dihydrochloride is treated with 2 N soda lye and the separating oil is dissolved in methylene chloride. After washing with water and drying over anhydrous sodium sulphate, the solvent is distilled off. Thus, 19.5 g. of the crude oily base compound is obtained which corresponds to about 70% of the theoretical.

EXAMPLE IV 0.25 g. of sodium are dissolved in 20 cc. of isopropanol. 1.30 g. of 3,4,5-trimethoxy benzoic acid are added thereto and, thereafter, 1.50 g. of N,N'-bis-(3 - bromopropyl) homopiperazine dihydrobromide [F.P.: 203° C.; prepared according to Example I from N,N'-bis-(3-bromopropyl) ethylene diamine and 1,3-dibromopropane] are added thereto. The mixture is heated to boiling at reflux for 12 hours. After cooling to room temperature, the separated sodium bromide is filtered off. The filtrate is evaporated in a vacuum. The residue is dissolved in water, rendered alkaline and extracted with ether. The dried ethereal extracts are evaporated, the residue is dissolved in 3 cc. of alcohol and treated with ethereal HCl. Thus, the dihydrochloride of N,N'-bis-[3-(3',4',5'-trimethoxy benzoyloxy) propyl] homopiperazine is obtained. Upon recrystallization from 2 cc. of alcohol, 0.6 g. of the above dihydrochloride monohydrate is obtained. This compound has a melting point at 196–199° C.

EXAMPLE V 40.4 g. of 3,4,5-trimethoxy benzoic acid 3'-chloropropyl ester, 7.0 g. of homopiperazine, 9.7 g. of potassium carbonate and 70 cc. of anhydrous dioxane are heated to boiling at reflux for 25 hours. The resulting reaction mixture is added to water and evtracted twice with methylene chloride. The combined methylene extracts are washed 3 times with water. Thereafter, the methylene chloride solution is shaken with 2 N hydrochloric acid. N,N'-bis-[3-(3',4',4'-trimethoxy benzoyloxy) propyl] homopiperazine dihydrochloride separates as an oily product. It is immediately separated and the product solidifies upon standing for a short time. Liquid is sucked off under pressing and the resulting product is recrystallized from about 100 cc. of ethanol. The resulting reaction product crystallizes with a substantial amount of water of crystallization. After drying over P$_2$O$_5$ for a prolonged period of time, the monohydrate is obtained. Yield: 21 g. (43.2% of the theoretical). F.P.: 196–197° C.

EXAMPLE VI 30.7 g. of 3,4,5-trimethoxy benzoic acid chloride are dissolved in 20 cc. of anhydrous benzene in a three-necked bottle equipped with a reflux condensor. A mixture of 15.2 g. of N,N'-bis-(3'-hydroxypropyl-1,5-diazacyclooctane (B.P.$_{0.05\ mm.}$: 135–140° C.; prepared as described in Example I from N,N'-bis-(3-hydroxypropyl) propylene diamine-1,3 and chlorobromopropane), 14 g. of triethylamine and 200 cc. of anhydrous benzene is added dropwise at 50 to 60° C. Thereafter, the reaction mixture is heated to boiling at reflux for 1½ hours. After cooling to room temperature, the precipitated triethylamine hydrochloride is separated by filtration. The filtrate is extracted with 2 N hydrochloric acid. After separation of the two layers, the aqueous phase is separated and rendered alkaline by the addition of concentrated soda lye with cooling. The resulting mixture is extracted with benzene. The benzene solution is dried over anhydrous sodium sulphate and the solvent is evaporated in a vacuum. Thus, 34.5 g. of the base is obtained as an oil. For converting the base into the dihydrochloride, the oily base is dissolved in 100 cc. of alcohol and ethereal HCl is added.

EXAMPLE VII

N,N'-bis[3-(3',4',5'-trimethoxy benzoyloxy) propyl] homopiperazine dihydrochloride monohydrate, polyvinyl pyrrolidone, corn starch, talcum (free of iron) and magnesium stearate are intimately mixed in such proportions that a tablet produced therefrom contains 28.75 mg. of the above homopiperazine dihydrochloride compound (corresponding to 25 mg. of the base), 0.7 mg. of polyvinyl pyrrolidone, 87.0 mg. of corn starch, 12.0 mg. of talcum and 1.0 mg. of magnesium stearate. These tablets are coated in manners known per se to yield dragées weighing about 240 mg. each.

When intimately mixing the above components in such proportions that each tablet contains 57.50 mg. of said salt of homopiperazine derivative, 1.4 mg. of polyvinyl pyrrolidone, 120.4 mg. of corn starch, 18.0 mg. of talcum (free of iron) and 1.6 mg. of magnesium stearate, and when coating said tablets to a total weight of 380 mg. per each dragée, dragées are produced containing 50 mg. of the active base each.

EXAMPLE VIII

A solution for injection is prepared by dissolving N,N'-bis-[3-(3',4',5'-trimethoxy benzoyloxy) propyl] homopiperazine dihydrochloride monohydrate in aqua pro inj. in an amount equivalent to 11.5 mg. per ml. of solution. This solution containing 10 mg. of the base per ml. is filled into ampoules.

EXAMPLE IX

A patient 35 years of age and suffering of serious angina pectoris following apoplexia was treated. Two 1 ml. ampoules (containing 10 mg. of N,N'-bis[3-(3',4',5'-trimethoxy benzoyloxy] propyl) homopiperazine each in the form of its dihydrochloride) per day were administered intravenously for 5 days and, thereafter, two dragées containing 50 mg. of said homopiperazine compound in the form of its dihydrochloride monohydrate were administered three times a day for three weeks. Thus, a substantial improvement of the illness occurred and the capacity of the patient increased considerably. No side effects have been observed.

What we claim is:

1. A compound selected from the group consisting of the basic esters of the Formula I:

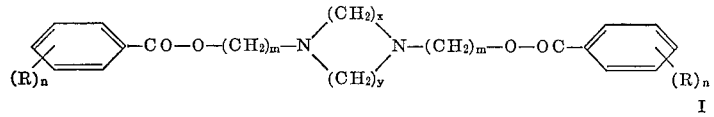

wherein R represents a lower alkoxy group, $n$ is a numeral of from 1 to 3, $m$ is a numeral selected from the group consisting of 2 and 3, $x$ is a numeral of from 2 to 4, $y$ is a numeral selected from the group consisting of 2 and 3 and $x$ and $y$ together represent a numeral of from 5 to 7, and the acid addition salts thereof with pharmacologically acceptable acids.

2. A compound selected from the group consisting of N,N'-bis[3 - (3',4',5' - trimethoxy benzoyloxy) propyl] homopiperazine and the acid addition salts thereof with pharmacologically acceptable acids.

3. N,N'-bis-[3-(3',4',5'-trimethoxy benzoyloxy) propyl] homopiperazine dihydrochloride.

References Cited

UNITED STATES PATENTS 3,267,103   8/1966   Kraupp et al. _____ 260—239

ALTON D. ROLLINS, Primary Examiner

U.S. Cl. X.R.

424—16, 244